United States Patent [19]

Bussiere

[11] Patent Number: 5,490,344
[45] Date of Patent: Feb. 13, 1996

[54] GLOW-IN-THE-DARK MATERIAL FOR FISHING ACCESSORIES

[76] Inventor: Robert A. Bussiere, 1405 Whisperwood Dr., Columbus, Ga. 31907

[21] Appl. No.: 216,228

[22] Filed: Mar. 22, 1994

[51] Int. Cl.⁶ .................. A01K 75/02; A01K 85/01; C09K 11/00
[52] U.S. Cl. .............. 43/17.5; 43/17.6; 43/42.24; 252/301.36
[58] Field of Search .............. 252/301.36; 43/42.24, 43/17.5, 17.6

[56] References Cited

U.S. PATENT DOCUMENTS

| | | | |
|---|---|---|---|
| 2,563,522 | 8/1951 | Fisher | 43/42.24 |
| 3,392,475 | 7/1968 | Vakousky, Jr. | 43/17.5 |
| 3,918,190 | 11/1975 | Hornbeck | 43/4.5 |
| 3,935,659 | 2/1976 | McCallum | 43/17.6 |
| 4,501,564 | 2/1985 | Cairone, Sr. | 43/17.5 |
| 4,530,179 | 7/1985 | Larew | 43/42.24 |
| 4,640,797 | 2/1987 | Goguen | 252/301.36 |
| 4,700,504 | 10/1987 | Mattison | 43/42.33 |
| 4,741,120 | 5/1988 | Cota et al. | 43/17.6 |
| 5,063,703 | 11/1991 | Riley | 43/42.06 |
| 5,146,707 | 9/1992 | Nichols | 43/42.53 |
| 5,251,395 | 10/1993 | Wicklund | 43/42.25 |

FOREIGN PATENT DOCUMENTS

| | | | |
|---|---|---|---|
| 483892 | 5/1990 | European Pat. Off. | 252/301.36 |
| 2569947 | 11/1986 | France . | |
| 2085465 | 4/1982 | United Kingdom | 252/301.36 |

*Primary Examiner*—C. Melissa Bonner
*Attorney, Agent, or Firm*—Pennie & Edmonds

[57] ABSTRACT

A glow-in-the-dark composition suitable for molding fishing lures and fishing accessories is disclosed that provides improved glowing capabilities. By combining a white powder (preferably baking soda or salt) with a plastic resin and further including phosphorescent substance, mineral oil, color concentrate, foaming agent and silicone, plastic fishing accessories are created with superior glowing capacity. Briefly exposing the fishing accessories to light will cause them to emit light for a substantial amount of time, helping to attract fish.

12 Claims, 1 Drawing Sheet

5,490,344

GLOW-IN-THE-DARK MATERIAL FOR FISHING ACCESSORIES

BACKGROUND OF THE INVENTION

The present invention relates generally to an improved glow-in-the-dark plastic composition, particularly suited for fishing lures and other fishing accessories that emit light.

Fishing lures and accessories that glow in the dark and in deep water have been sought after by fishing enthusiasts in an effort to attract fish. Fishing lures that emit light have been sought to enhance fishing during dark hours, such as early morning and evening, and for fishing in dark waters. In addition, many fish may be attracted to glowing bait, which simulates the bioluminescence which some sea creatures emit naturally. Previous efforts in this field have resulted in lures that did not have sufficient glowing capacity to emit light of sufficient intensity or duration. There have been many attempts to attract fish by using light in various ways. In U.S. Pat. No. 5,146,707 to Nichols, a coating of light-dispersing glitter is applied to fishing lures. This lure does not actually emit light, but depends on a light source to reflect. It is also well known in the field to use fluorescent paint on lures, but as the lures only reflect ambient light, they are of little use during the peak periods of fishing, early in the morning and at dusk.

Fishing lures have also been developed using the principle of chemiluminescence. In general, these lures are expensive and difficult to manufacture. U.S. Pat. No. 3,918,190 to Hornbeck discloses injecting a liquid chemiluminescent material into the internal tract of organic fishing baits such as worms. This reference requires the user to have organic bait, and inject the bait with the material when ready to fish. U.S. Pat. No. 4,700,504 to Mattison discloses a fishing lure that consists of a hollow body formed of translucent fluorescent polymer material with an elongated chemiluminescent capsule within. U.S. Pat. No. 4,741,120 to Cota et al. discloses a self-illuminating fishing lure that has a hard body encasing a tritium (a hydrogen isotope) capsule lined with phosphor that produces light.

The use of phosphorescent materials has also been experimented with. In U.S. Pat. No. 3,935,659 to McCallum, a strip of phosphorescent material is embedded in a translucent plastic body shaped as a worm, or is applied to the exterior surface of a lure body. U.S. Pat. No. 5,063,703 to Riley discloses artificial fish bait that is formed of a blend of freeze-dried fish food, fish oil, and a nontoxic phosphorescent material in a plastic body. This reference would not emit light for an extended amount of time, and would be difficult and expensive to manufacture, as freeze-dried fish food and fish oil are required for the lures.

SUMMARY OF THE INVENTION

It is an object of this invention to provide an improved glow-in-the-dark material suitable for glowing fishing lures and other fishing accessories that have superior glowing capabilities and are easy and inexpensive to manufacture.

The improved glowing capabilities are provided in the present invention though a combination of plastic resin with at least an relatively fine white powder and a phosphorescent substance. In a preferred embodiment the composition also includes a color concentrate, mineral oil, silicone, and a foaming agent.

The plastic resin utilized can be any plastic that can be injection molded, extruded, blow molded or plastisol molded. Typical materials include thermoplastic rubber, styrenics, polyolefin and plastisol.

A method of manufacture for the fishing accessories according to the invention is simple and inexpensive, involving combining the elements within certain volume percentages, and then molding, extruding, or similarly shaping the plastic formulation into any desired shape.

DETAILED DESCRIPTION OF THE INVENTION

Figure 1:
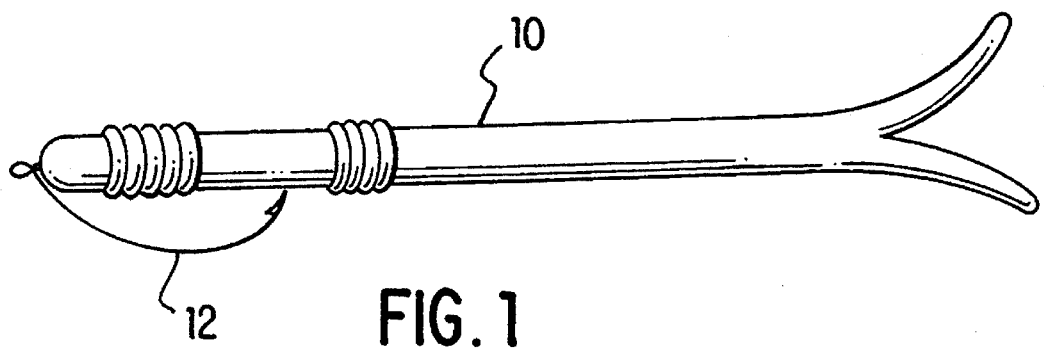
FIG. 1 is a perspective view of a fishing lure of the present invention.

As shown in FIG. 1, a preferred embodiment of the present invention is a fishing lure 10, molded from the glow-in-the-dark composition according to the present invention. It is to be understood that a wide variety of shapes and sizes of fishing lures can be molded from the formulation of the present invention, including worms, lizards, eels, and other shapes that might be attractive to fish. Hook 12 maybe molded into the lure or the lure body can be provided without a hook, to be placed on a hook by the user.

Figure 2:
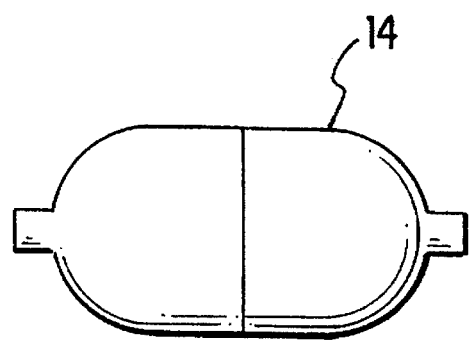
FIG. 2 is a perspective view of a bobber of the present invention.

FIG. 2 illustrates a bobber, 14 made of the plastic formulation of the present invention. A glowing bobber is especially helpful when fishing in partial darkness, when a standard red and white bobber may be difficult to see clearly.

The plastic resin used can be varied depending on the accessory being produced and its end use. For example, for fishing lures, a softer plastic such as plastisol is desired for a more realistic effect, but for a bobber, a hard plastic such as a styrenic is more suitable. Also, harder plastics are more appropriate if the accessories are to be used in salt water. Other suitable plastic resins may be selected by those skilled in the art.

In one example of the present invention, the following additives are incorporated and molded with the desired plastic resin (approximate percentages are by volume):

0.1%–2% Baking Soda, Salt or other relatively fine white powder 0.5%–9% Phosphorescent substance 0.1%–1% Mineral Oil 0.1%–1% Color Concentrate 0.2%–2% Foaming Agent 0.1%–1% Silicone The balance of the composition comprises the plastic resin. The combination of these elements results in a material with dramatically improved glowing capabilities. Fishing accessories molded from this material can be exposed to an ultra-violet containing light source for as little as 45 seconds, and will then emit light for 30 minutes.

Baking soda or salt provide a white background for the phosphorescent substance which forces it toward the surface and enhances the brightness of the material. Baking soda is most preferably used in the formulation, as it makes the plastic formulation swell. Salt also has an advantage to its use, in that when fish bite into a lure with salt they tend to hold on to the lure longer, increasing the chance of being caught. However, it is to be understood that any relatively fine white powder material that is compatible with the other materials may be used to provide a white background for the phosphorescent substance in accordance with the invention.

Phosphorescent substances are known and will emit light after they are exposed to a light source for a period of time. The material used in the preferred embodiment is Grade SSU Phosphorescence, and was obtained from United Mineral Chemical Corporation, but any suitable phosphorescent material may be used. The mineral oil of the formulation is added for assistance in material flow and for better adhesion of the other additives to the plastic material. The foaming agent is used to fill the interior, and assist the baking soda or salt in forcing the phosphorescent substance close to the surface of the part, to ensure the best possible glowing capability. Color concentrate may be added, and is forced to the surface by the foaming agent and baking soda or salt to create glowing lures of multiple colors. Silicone is added to aid in releasing the objects from the molds and to give lures a more life-like feeling.

A preferred embodiment of the fishing accessories of the present invention comprises the following composition with the desired plastic resin:

1% Baking Soda or Salt

4% Phosphorescent material 0.5% Mineral Oil 0.5% Color Concentrate 0.75% Foaming Agent 0.25% Silicone where in the balance by volume comprises the plastic resin.

I claim:

1. An improved glow-in-the-dark composition suitable for molding of fishing accessories, said composition comprising:

about 0.1%–2% by volume white powder, wherein the white powder is selected from a group consisting of baking soda and salt; and about 0.5%–9% by volume phosphorescent substance, wherein the balance of the composition comprises a plastic resin, and wherein said white powder provides a background to enhance the brightness of said phosphorescent substance.

2. The composition of claim 1 further comprising about 0.1%–1% mineral oil by volume.

3. The composition of claim 1 further comprising about 0.1%–1% color concentrate by volume.

4. The composition of claim 1 further comprising about 0.2%–2% foaming agent by volume.

5. The composition of claim 1 further comprising about 0.1%–1% silicone by volume.

6. An improved glow-in-the-dark composition suitable for molding of fishing accessories, comprising a plastic resin combined with:

about 0.1%–2% by volume white powder, wherein the white powder is selected from a group consisting of baking soda and salt;

about ½%–9% by volume phosphorescent substance;

about 0.1%–1% by volume mineral oil;

about 0.1%–1% by volume color concentrate;

about 0.2%–2% by volume foaming agent;

about 0.1%–1% by volume silicone, wherein the plastic resin comprises the balance by volume of the composition, and wherein said white powder provides a background to enhance the brightness of said phosphorescent substance.

7. The composition of claim 6, wherein the white powder comprises about 1% by volume.

8. A glow-in-the-dark fishing accessory comprising a plastic body molded from a composition including:

about 0.1%–2% by volume white powder, wherein the white powder is selected from a group consisting of baking soda and salt;

about 0.5%–9% by volume phosphorescent substance;

about 0.1%–1% by volume mineral oil;

about 0.2%–2% by volume foaming agent; and about 0.1%–1% by volume silicone, wherein the balance of the body by volume comprises a moldable plastic resin, and wherein said white powder provides a background to enhance the brightness of said phosphorescent substance.

9. The fishing accessory according to claim 8 further comprising about 0.1%–1% by volume color concentrate.

10. The fishing accessory of claim 8, further comprising a fishing hook placed said body.

11. A glow-in-the-dark fishing accessory comprising a molded plastic body wherein said body includes about 1% by volume baking soda or salt, 4% by volume phosphorescent material, 0.5% by volume mineral oil, 0.75% by volume foaming agent and 0.25% by volume silicone.

12. The fishing accessory according to claim 11 further comprising about 0.1%–1% by volume color concentrate.

* * * * *